United States Patent [19]
Remson

[11] Patent Number: 5,249,186
[45] Date of Patent: Sep. 28, 1993

[54] APPARATUS FOR DETECTING THE START OF FRAME IN BIPOLAR TRANSMISSION SYSTEMS

[75] Inventor: Joseph D. Remson, San Jose, Calif.

[73] Assignee: Rolm Company, Santa Clara, Calif.

[21] Appl. No.: 642,262

[22] Filed: Jan. 16, 1991

[51] Int. Cl.$^5$ .......................... H04B 1/10; H04L 7/02
[52] U.S. Cl. .......................................... 371/55; 371/6; 371/56; 375/110
[58] Field of Search ............... 371/55, 56, 6; 375/110, 375/113, 116, 117

[56] References Cited

U.S. PATENT DOCUMENTS

| | | | |
|---|---|---|---|
| 3,386,079 | 5/1968 | Wiggins | 371/6 |
| 3,523,278 | 8/1970 | Hinkel | 371/6 |
| 3,909,724 | 9/1975 | Spoth et al. | 371/6 |
| 4,071,692 | 1/1978 | Weir et al. | 178/68 |
| 4,509,164 | 4/1985 | Mouftah | 370/29 |
| 4,584,690 | 4/1986 | Cafiero et al. | 375/110 |
| 4,803,705 | 2/1989 | Gillingham et al. | 375/120 |
| 4,965,811 | 10/1990 | Sparks | 375/109 |

FOREIGN PATENT DOCUMENTS

3632719 3/1988 Fed. Rep. of Germany .

Primary Examiner—Charles E. Atkinson

[57] ABSTRACT

Apparatus is provided to provide a start of frame signal for an incoming bipolar information signal wherein one binary state is alternately encoded with positive and negative level pulses, each of a given duration, and the other binary state is encoded with a zero or reference level. The apparatus responds to said bipolar signal to provide a first series of pulses indicative of positive pulses and a second series of pulses indicative of negative pulses. A clock is provided which operates at a higher frequency than the bipolar signal. Counting means are provided and are responsive to said first and second signals and said clock to provide third and fourth signals each of said signals indicative of the true polarity of the input signal transitions to enable the processing of true data as compared to noise. The output of the counting means are coupled to logic means whereby if two or more successive pulses of the incoming signal have the same polarity, then a start of frame signal is provided by the logic means as coupled to the counting means.

20 Claims, 4 Drawing Sheets

APPARATUS FOR DETECTING THE START OF FRAME IN BIPOLAR TRANSMISSION SYSTEMS

FIELD OF INVENTION

This invention relates to a bipolar transmission system and more particularly to apparatus for detecting the start of frame in such a system.

BACKGROUND OF THE INVENTION

As one can ascertain, there are numerous line codes that are specifically designed to not contain DC energy and thereby be unaffected by DC removal. One such example of such a line code is bipolar coding which solves the DC wander problem by using three levels to encode binary data. Specifically, a logic "0" is encoded with zero voltage while a logic "1" is alternately encoded with positive and negative voltages. Hence the average voltage level is maintained at zero to eliminate DC components in the signal spectrum. Since bipolar coding uses alternate polarity pulses for encoding logic "1's", it is also referred to as "alternate mark inversion" (AMI). Mark is a term arising from telegraphy to refer to the active or "1" state of a level encoded transmission line. Bipolar coding is the basic line coding procedure used in many telephone systems as, for example, by T1 lines in the telephone network. Essentially, AMI transmission systems have been widely employed in telephone as above indicated. In such a transmission system, frames are used as a means of setting up communication channels. This method of dividing frames into fields is sometimes referred to as PPM or pulse position modulation. The least number of fields within a frame is two. One field is used for framing and the other field contains some data. The least number of bits per channel within a frame is one. Essentially, frames are employed in AMI, Manchester and related bipolar transmission systems. The frames are delineated by intentionally violating a characteristic of the modulation or an encoding violation. As one can ascertain, a violation in AMI modulation occurs in various different instances.

An object of the present invention is to provide apparatus to determine the occurrence of a violation in a bipolar transmission system and to provide suitable signals upon the determination of such a violation.

The present invention provides apparatus to determine if an incoming AMI signal contains a bit which has been true for a specified period of time and to further determine if two or more bits have been received of the same polarity from AMI encoded data indicative of a violation.

It is therefore a further object of the present invention to provide a bit validation and start of frame detection apparatus for an AMI or bipolar transmission system.

SUMMARY OF THE INVENTION

Apparatus for detecting a code violation in an incoming bipolar information signal having different polarity pulses each of a given duration, comprising clock means for providing an output clock signal of a frequency greater than the frequency of said bipolar signal, counting means responsive to said incoming bipolar signal to count a predetermined number of one polarity levels of said bipolar signal with respect to said clock means to provide an output signal when said one polarity level does not change to another polarity level subsequent to obtaining a count of said predetermined number, and means responsive to said output signal from said counting means and to said bipolar information signal to detect a violation in said signal whereby said violation is indicative of said one polarity level followed by another said one polarity level in succession.

DETAILED DESCRIPTION OF THE INVENTION

Referring to FIG. 1 there is shown a series of waveforms which will be employed in explaining the operation of the present invention. As indicated, frames in a bipolar transmission system as in an AMI system or, for example, a Manchester system are delineated by violating a characteristic of the modulation or the encoding. A violation in AMI modulation occurs when the polarity of the pulses remains the same for two or more pulses in succession. Frames in the AMI system are a fixed length and, for example, each frame may consist of 20 bits. The polarity of the violation varies based on the number of "1" bits contained in the frame. Therefore, it is necessary to test the status of the incoming data as a function of the data's polarity. In addition, it is necessary to insure that the information to be tested is valid. A method of validation is to test the duration of the incoming data. As will be explained, the circuitry according to this invention operates to do this.

Figure 1A:
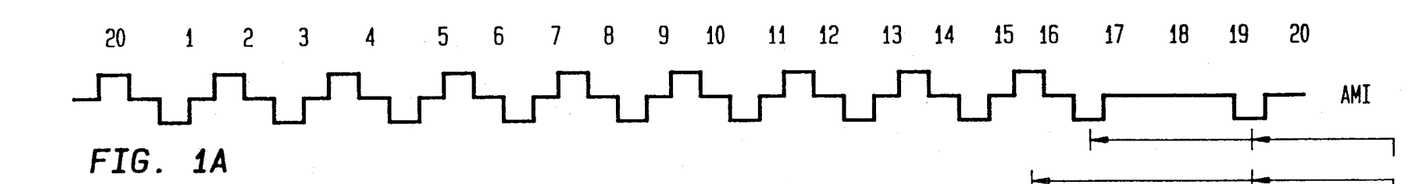
FIG. 1 consists of FIG. 1A-FIG. 1G constituting a series of waveforms necessary to explain the operation of the invention.

Referring to FIG. 1A there is shown an AMI signal. FIG. 1A depicts the signal over 20 bits which constitutes one frame. As one can see, the 17th bit is a inverted signal or a "1" and then the 18th and 19th bits are at the zero reference level or logic "0" with the 20th bit also being a "1" but having a negative polarity and the same as the 17th bit. Thus as one can see, there is an encoding violation as successive "ones" are always of alternate polarity. Hence, two successive negative pulses cannot occur. Therefore the waveform of FIG. 1A shows a violation between the 17th and 20th bits because the polarity of the pulses remains the same for the configuration shown in FIG. 1A.

Figure 1B:
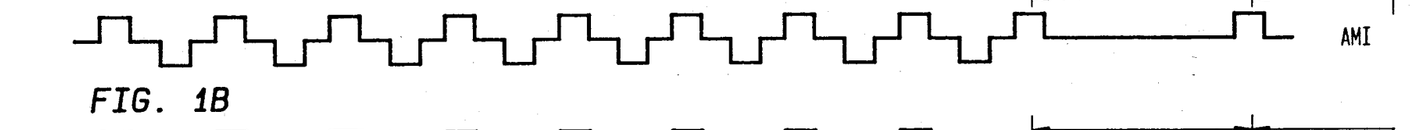

Referring to FIG. 1B there is again shown a frame or an incoming AMI signal. In FIG. 1B the 16th bit is positive and is then followed by another positive bit for the 20th bit with bits 17, 18, and 19 being at zero voltage or reference potential. Again, the waveform of FIG. 1B shows an improper AMI transition where the polarity of the pulses, namely the 16th and the 20th pulse, remains the same in succession. This also constitutes a violation in encoding, which can be used to determine the start of a frame (SOF).

Figure 1C:
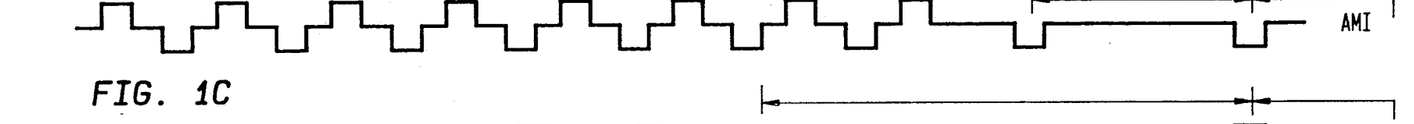

Referring to FIG. 1C there is shown still another violation where another frame of 20 bits is shown. In FIG. 1C it is seen that the 16th bit and the 20th bit are both negative, with bits 17, 18, and 19 being at zero level, hence giving another violation which violation can constitute the start of a frame signal.

Figure 1D:
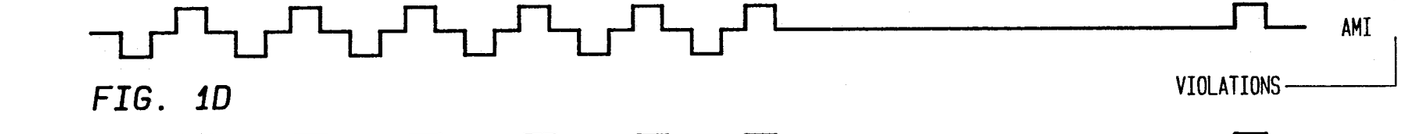

FIG. 1D shows a violation existing again in regard to bits 12 and 20, which are the same polarity level and not alternate polarity as required by the system's encoding.

One can see from the above that there are many types of violations which can exist and which can indicate a start of frame (SOF) or improper data and so on.

Figure 1E:
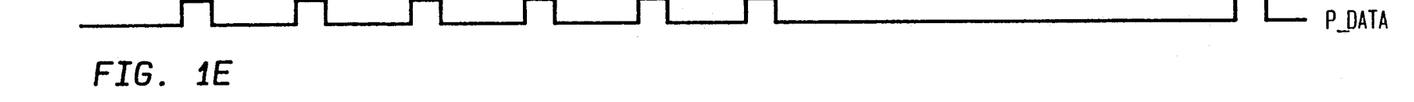

Referring to FIG. 1E there is shown a signal designated as P_DATA. As one can see, the P_DATA signal represents positive polarity data which exists on the AMI signal The P_DATA signal of FIG. 1E corresponds to the AMI transmission as shown in FIG. 1D. Therefore for each positive pulse of FIG. 1D there is a positive pulse in FIG. 1E of the same duration.

Figure 1F:
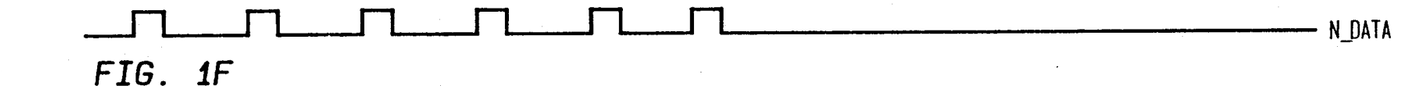

FIG. 1F depicts an N_DATA signal. As one can see from FIG. 1F, the signal N_DATA represents negative polarity data taken from the bipolar encoded transmission system waveform (AMI) of FIG. 1D. The N_DATA signal provides a positive pulse for each negative pulse of the AMI signal of FIG. 1D. The P_DATA signal and the N_DATA signal are combined in an OR gate or similar gate to form the signal shown in FIG. 1G. This signal is known as R_DATA. As one can see the R_DATA signal contains the ORed combination of P_DATA and N_DATA.

Figure 1G:
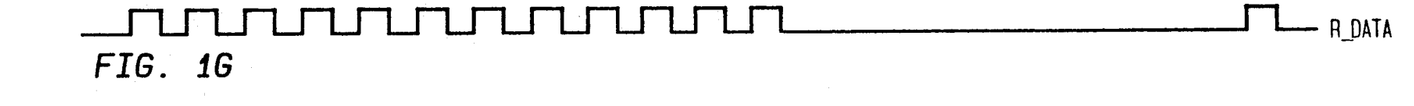
Figure 2:
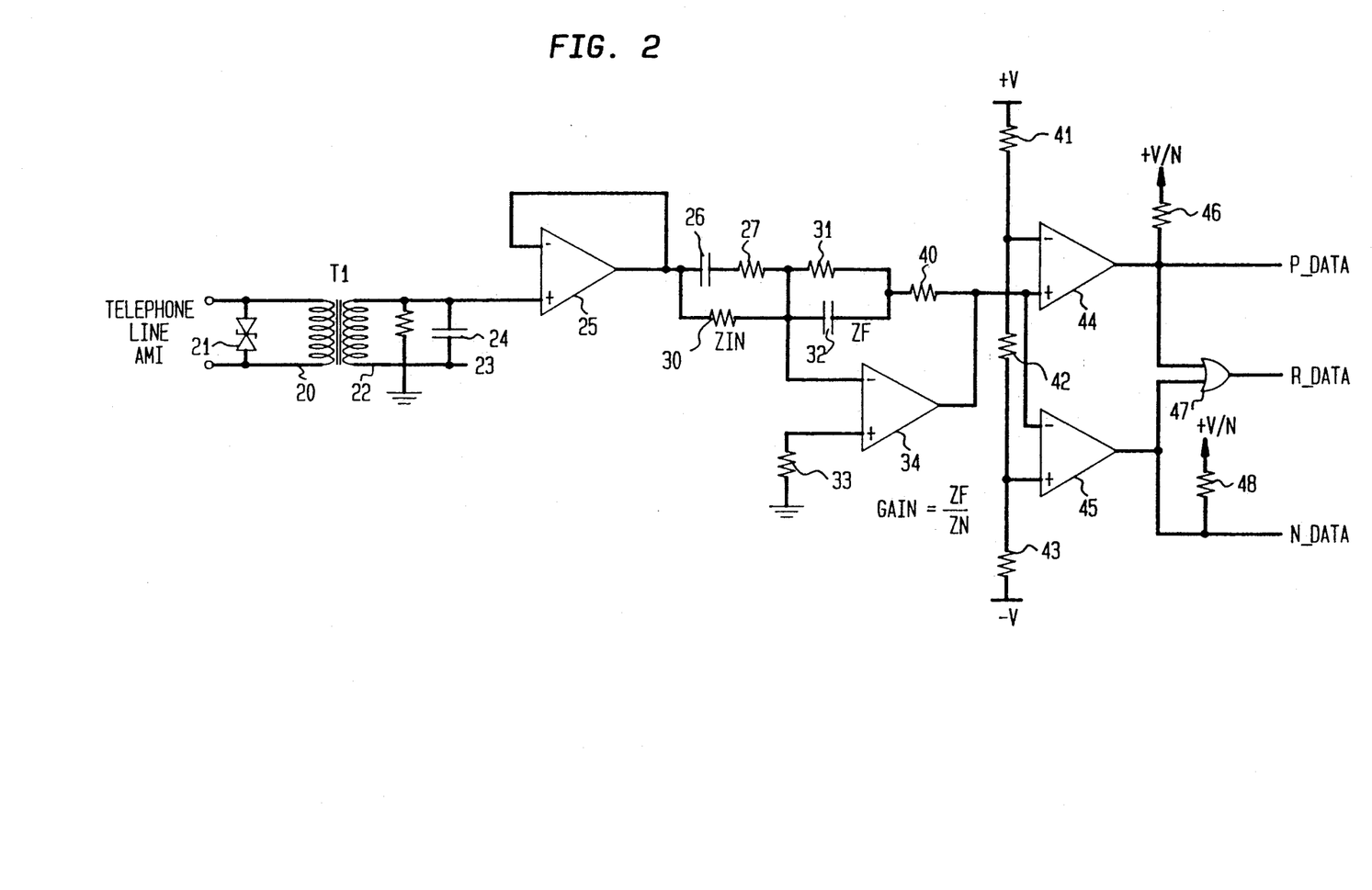
FIG. 2 is a circuit diagram showing an apparatus for separating an AMI signal into the positive and negative data signals.

The circuit of FIG. 2 is a typical example of a circuit which can be employed to separate the P_DATA and N_DATA signals from the AMI signal and to combine them to provide the R_DATA signal. As will be explained, the signals of FIG. 1E, 1F and 1G, namely the P_DATA, N_DATA and R_DATA signals, are employed in conjunction with this invention to provide bit validation and start of frame detection circuit which is useful in the AMI transmission system.

It is noted that the apparatus of FIG. 2 is the subject matter of a co-pending U.S. application entitled APPARATUS FOR CONVERTING AN ALTERNATE MARK INVERSION SIGNAL TO UNIPOLAR SIGNALS filed on Dec. 28, 1990, Ser. No. 07/635,051 and assigned to the assignee herein U.S. Pat. No. 5,113,186.

Referring to FIG. 2 there is shown a circuit diagram depicting an alternate mark inversion to unipolar converter which can be employed to provide the P_DATA, N_DATA and R_DATA signals. As seen in FIG. 2, an AMI signal as present on a telephone line is applied to the primary winding 20 of transformer T1. The primary winding 20 is conventionally protected by means of back to back Zener diodes or a diode network 21 to limit the magnitude of transients applied. Many protective devices are known and can be employed in lieu of network 21. The primary winding 20 is magnetically coupled to a secondary winding 22 which is shunted by means of a resistor 23 in shunt with a capacitor 24. Thus the AMI signal from the telephone line is isolated from the AMI converter to be described by means of the transformer T1. The back to back diode device 21 as indicated is a protective device to prevent incoming transients from damaging the electronic circuit on the other side of the transformer. The combination of resistor 23 in shunt with capacitor 24 is used for impedance matching. The secondary winding has one terminal coupled to reference potential and the other terminal coupled to the non-inverting input of an operational amplifier 25 arranged in a unity gain configuration. The operational amplifier 25 has its output coupled to the inverting terminal as is well known in the art.

Figure 3:
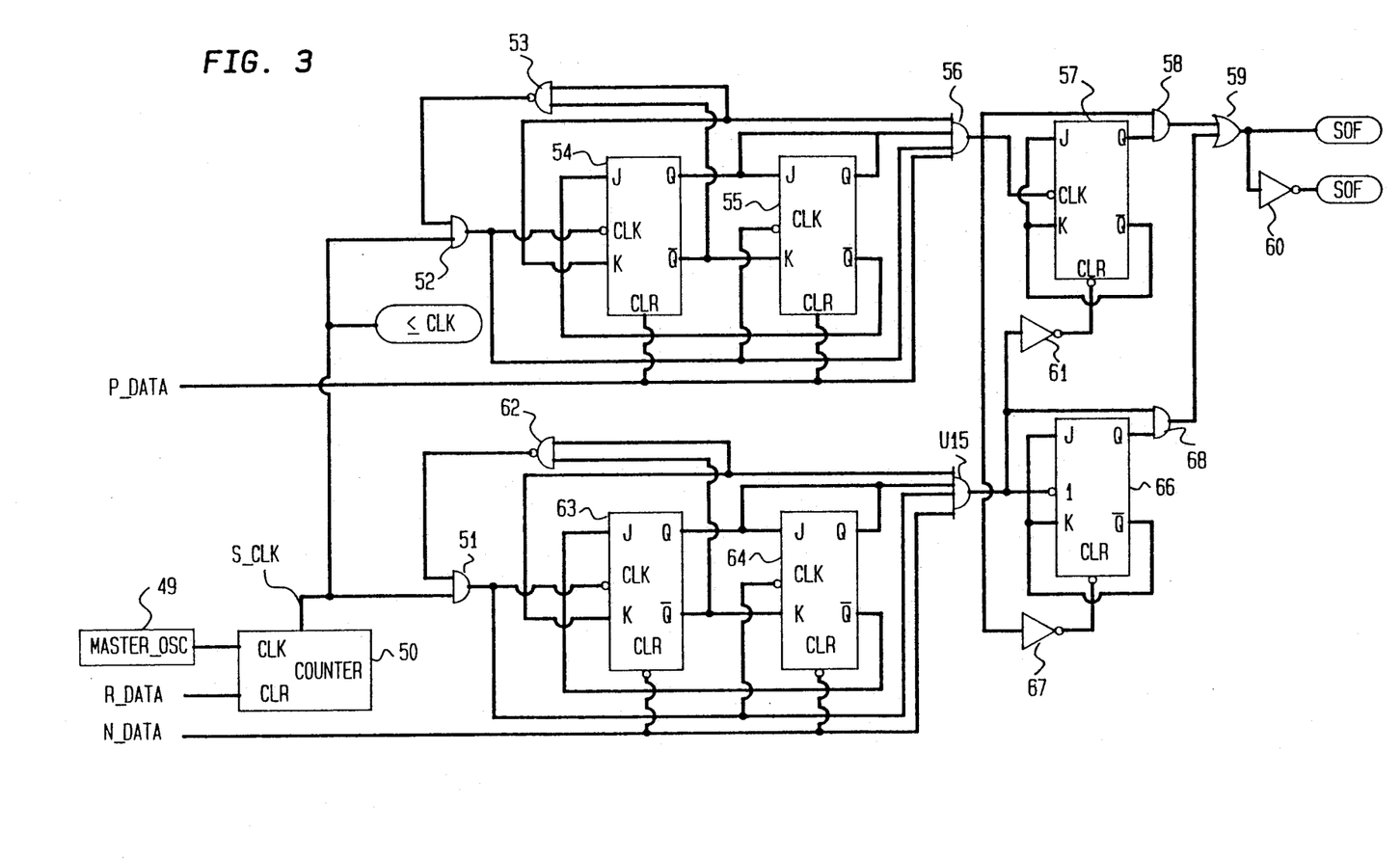
FIG. 3 is a detailed block diagram of a frame detection circuit according to this invention.

Essentially the operational amplifier 25 is arranged as a unity gain amplifier and used as an impedance transformer/buffer. Operational amplifiers are well known and many types can be employed for the circuit 25. The output of the unity gain amplifier 25 is directed to the inverting input terminal 28 of another operational amplifier 34 via a capacitor 26 in series with a resistor 27. The capacitor 26 and the resistor 27 appear in series and are shunted by means of a resistor 30. This network serves as the input impedance network ($Z_{in}$) for the amplifier 34. The network varies impedance with frequency as will be explained. The amplifier 34 has the non-inverting input returned to the point of reference potential via resistor 33. The output of amplifier 34 is coupled back to the input 28 through a feedback network which consists of resistor 40 in series with the parallel combination of inductor 31 and capacitor 32. The other terminal of inductor 31 and capacitor 32 is coupled to terminal 28 which, as indicated above, is the inverting input of amplifier 34. The amplifier 34 possesses a gain characteristic which is shown in FIG. 3 of the co-pending application depicting a plot of the impedance vs. frequency. As one can ascertain from FIG. 2, the inductance 31 in shunt with capacitor 32 forms an LC circuit which has a particular resonance. The point of resonance is selected to be significantly higher than the effective input frequency of the AMI signal. For a given gain bandwidth function the point of resonance would be selected to be much higher than this gain bandwidth factor. The amplifier 34 operates to compensate for the deterioration of the higher frequency components of the AMI signal due to transmission line losses and so on. Basically, resistor 30, resistor 27, and capacitor 26 form the input impedance circuit to the amplifier 34. The resistor 40, inductor 31, and capacitor 32 form the feedback path. Hence as is well known, the gain of an operational amplifier such as 34, follows the general equation. This gain is equal to the feedback impedance ($Z_f$) divided by the input impedance ($Z_{in}$) or Gain = $Z_f/Z_{in}$.

The impedance $Z_f$ of the tank circuit which essentially consists of inductor 31 and capacitor 32 increases as the frequency increases towards resonance but the value of the tank circuit is selected so that it does not reach resonance. The impedance $Z_{in}$ of the input circuit decreases as the input frequency increases based on the gain factor of the amplifier. Thus there is a marked increase in gain for the higher frequency components of the AMI signal. The output of the amplifier stage 34 is also directed to the non-inverting input of a first comparator 44 and to the inverting input of a second comparator 45. Comparator 44 and comparator 45 are operational amplifiers or comparators which receive a reference bias level from a voltage divider consisting of resistors 41, 42, and 43 coupled between a positive voltage source designated as +V and a negative voltage source designated -V. The value of the +V and -V sources can be +12 volts. The resistors are selected so that there is a fixed negative voltage applied to the non-inverting input of comparator 45 and an equal fixed positive voltage applied to the inverting input of comparator 44. The resistors 41, 42, and 43 are selected so that 41 may be equal to 10K, 42 equal to 4K, and 43 also equal to 10K. In this manner the stages form a bipolar to unipolar demodulator. The voltage levels at the inverting and non-inverting inputs of devices 44 and 45 respectively are selected to accommodate the noisy situation in which the system is specified to operate in. The output of amplifier 34 is coupled respectively to the non-inverting input of amplifier 44 and to the inverting input of amplifier 45. Therefore when the magnitude of the voltage applied to the non-inverting input of amplifier 44 exceeds the voltage at the inverting input, the output of amplifier 44 will rise to a TTL logical "1" level. Similarly, when the magnitude of the voltage applied to the inverting input of amplifier 45 exceeds the voltage at the non-inverting input of the amplifier, the output of the amplifier will rise to a TTL logical "1" level. The outputs remain at the logical "1" levels as long as the input voltage exceeds the respective magnitudes. The output of comparator 44 is referenced to a voltage level via resistor 46 as is the output of comparator 45 referenced to the same voltage level designated as +V/N via resistor 48. Thus the output of amplifier 44 produces P_DATA as shown in FIG. 1E. The output of amplifier 45 provides N-DATA as shown in FIG. IF. The OR gate 47 receives the output from amplifiers 44 and 45 to produce the ORed output designated as R_DATA and as shown in FIG. 1G.

As will be understood there are many other ways of separating the P_DATA and N_DATA signals from the AMI signal and other ways of forming the R_DATA signal.

Referring to FIG. 3 there is shown a circuit schematic diagram of a bit validation and start of frame detection apparatus according to the principles of this invention.

As above indicated, a violation in AMI modulation occurs when the polarity of the pulses remains the same for two or more pulses in succession and as shown as violations for the signals shown in FIGS. 1A to FIG. 1D. Frames are of a fixed length as, for example, 20 bits. The polarity of the violation varies based on the number of "1" bits contained in the frame. Therefore it is necessary to test the status of the incoming data as a function of the data's polarity. In addition, it is necessary to insure that the information to be tested is valid. A method of validation is to test the duration of incoming data. Thus the circuitry shown in FIG. 3 provides a means of testing the data both for duration and polarity of the data. As seen in FIG. 3, the R_DATA signal is applied to the clear input of a counter 50. The counter receives a master oscillator signal at the clock input. This frequency is selected to be much higher than the AMI rate and, for example, can be 10Mhz or greater. In this manner the counter 50 is used as a frequency divider and may provide a division by a suitable factor. The output of the counter is a signal designated as S_CLK which signal is held off until the R_DATA goes true. The S_CLK frequency is such that three clock counts will be reached in about 50% of the true period of the incoming data. If reference is made to FIG. 4A, there is shown a P_DATA signal which constitutes a half of a bit cell duration. FIG. 4B shows the S_CLK signal. It is seen that the S_CLK signal provides 6 pulses during the duration of the half bit cell or P_DATA signal. The P_DATA signal is applied to the clear (CLR) inputs of flip-flops 54 and 55 and is also applied to one input of AND gate 56. The flip-flops 54 and 55 are JK flip-flops. It is understood that other configurations could be employed as well. As seen in FIG. 3, flip-flops 54 and 55 are configured as a "Johnson" or ring counter. This type of counter provides a gray code counting method whereby one stage changes state at each S_CLK input avoiding timing generated noise glitches. Thus as seen, the input to the counter which is the clock (CLK) inputs of the JK flip-flops 54 and 55 is obtained from the AND gate 52 having the S_CLK signal applied to one input. Another AND gate 53 has one input coupled to the $\overline{Q}$ output of flip-flop 54 and one input coupled to the Q output of flip-flop 55. The purpose of gate 53 is to decode an output count of three from the counter. The output of gate 53 is coupled to the other input of AND gate 52. Thus when the output from AND gate 53 is low, this disables NAND gate 52 and therefore prevents any further S_CLK signals from being applied to the counter consisting of JK flip-flops 54 and 55. If P_DATA goes false prior to a count of three, the ring counter is held to its cleared position until the data goes true again. In this manner the counter is held to all zeros if the P_DATA signal goes false prior to a count of three. In addition, the R_DATA signal will also go false resetting counter 50. As will be further seen, this operation eventually causes the signal at the output of gates 60 and 59 which is designated as the start of frame (SOF) signal to fall very near the middle of the true period of the incoming data. The output signal from gate 59 is the start of frame (SOF) signal or a code violation signal and the output from inverter 60 is the inverse signal (SOF). As one can see, the Q outputs from flip-flops 54 and 55 are applied to a separate input of AND gate 56. AND gate 56 as indicated has four inputs. A first input to AND gate 56 is the P_DATA signal. A second input to AND gate 56 is the output from gate 52 which is the S_CLK. A third input to AND gate 56 is the Q output of flip-flop 54 and the fourth input to AND gate 56 is the Q output of flip-flop 55. The waveform at the output of AND gate 56 is shown in FIG. 4E. The Q output of flip-flop 54 is shown in FIG. 4C while the Q output of flip-flop 55 is shown in FIG. 4D. As seen AND gate 56 provides an output when counters 54 and 55 reach the count of three (1,1) and the S_CLK and P_DATA are "true" or at logic "1". Thus the output of gate 5 is positive if the data applied to the input remains true for a minimum of three counts. The Q output of JK flip-flop 57 is toggle true at the trailing edge of S_CLK. This is shown in FIG. 4F which represents the Q output of flip-flop 57. The output of gate 56 is applied to the clock input (CLK) of flip-flop 57. The Q output of flip-flop 57 is applied to one input of AND gate 58 with the other input of AND gate 58 applied to the output of AND gate 56. The output of AND gate 58 is applied to one input of the OR gate 59. The output of OR gate 59 is the start of frame (SOF) signal or a code violation signal. The output of gate 59 is also applied to an inverter 60 to produce the negative or the $\overline{SOF}$ signal. As seen, the $\overline{Q}$ output of flip-flop 57 is applied to its own J and K inputs to prevent it from toggling once the Q output has gone false. The Q output of flip-flop 57 partially enables the AND gate 58. If the next incoming mark is the same polarity, while the Q output of flip-flop 57 is true, then the AND gate 58 is completely enabled for the duration of the positive period of the third S_CLK. In this manner the SOF output of gate 59 will be generated both at the output of gate 59 and at the output of inverter 60, respectively. As one can see, the above-noted discussion concentrated upon circuit operation for the P_DATA signal. Essentially the N_DATA signal operation is implemented in the same exact manner. Thus the S_CLK is again applied via gate 51 to the clock inputs of flip-flop 63 and 64 arranged in the same counting configurations as flip-flops 54 and 55. The N_DATA signal is applied to the clear inputs of flip-flop 63 and 64.

The flip-flops 63 and 64 have the count of 3 monitored by NAND gate 62 which has its output coupled to one input of 51 thereby disabling the same as above described for gates 52 and 53. The AND gate 65 has four inputs as gate 56 and operates in the same manner. In this manner AND gate 65 has a first input which is the Q output of flip-flop 54, a second input which is the Q output of flip-flop flop 63, a third input which is the output of gate 51 and a fourth input which is the N_DATA input. The output of gate 65 is coupled to the clock input (CLK) of the toggle flip-flop 56 which operates in the same manner as flip-flop 57. The Q output of flip-flop 56 is coupled to one input of AND gate 68. The other input of gate 68 is coupled to the output of gate 65. The output of gate 68 is also coupled to the other input of OR gate 59 to generate an SOF signal for N_DATA signal violations or negative pulse violations of the AMI signal. It is seen that inverters 61 and 67 operate to clear flip-flops 66 and 57 when P_DATA or N_DATA is controlling. Thus as seen, the above-noted circuit operates as the same way as the P_DATA circuit except that the operation of, for example, the circuit containing counters 63 and 64 is for N_DATA. Thus when consecutive marks or true periods are of the opposite polarity, flip-flops 57 and 66 are cleared. Assume now that flip-flop 57 has been set true by a P_DATA mark. If the next true is generated from N_DATA, the output of inverter 61 will go false clearing flip-flop 57, leaving the Q output from flip-flop 66 true. If the next mark is generated by P_DATA, the output of inverter 67 will go false, clearing flip-flop 66. Therefore no SOF signal is generated. As an example, the period of an AMI bit cell at 160 kilobits per second is 6.250 microseconds. A logic "1" or mark condition is signified by the level remaining high for the first half of the cell period which is 3.125 microseconds. The objective is to have the third clock pulse fall in the center of this true period or about 1.56 microseconds into the period. Dividing the output of a 16 MHZ oscillator to 1.6 Mhz will cause this to occur. The SOF pulse will be 0.3125 microseconds wide. A narrow SOF pulse is beneficial if it is used as for example in a digital phase lock loop (DPLL). Wide pulses may hold counters and the like reset while the pulse is true. Thus, the circuit of FIG. 3 operates to do so.

Figure 4A:
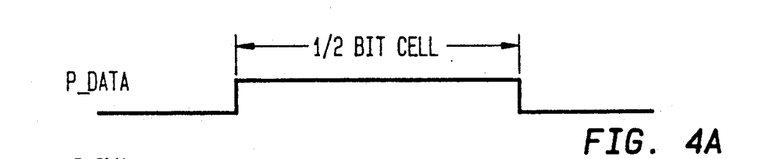
FIG. 4 is a series of waveforms FIGS. 4A to 4F generated by the circuit of FIG. 3.
Figures 4B, 4C, 4D, 4E:
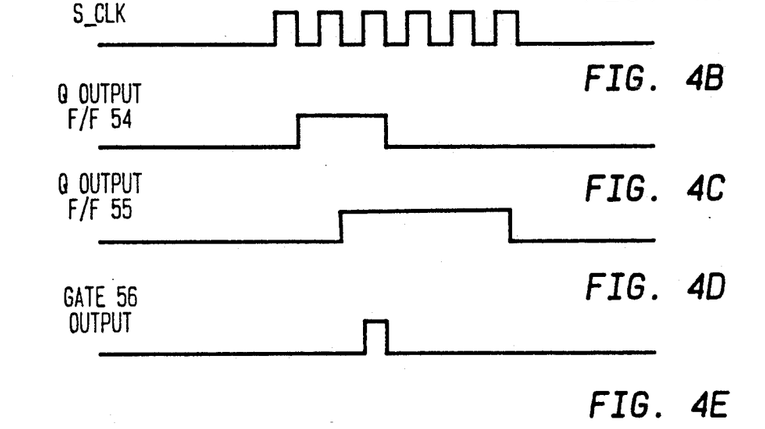
Figure 4F:
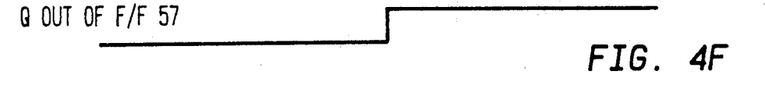

FIG. 4A shows the typical one-half cell bit or the pulse duration for a P_DATA or N_DATA signal. FIG. 4B shows the S_CLK si As one can see, there are six S_CLK pulses within or N_DATA pulse duration. This divides the duration by six. The number six is arbitrary and a greater or lesser number can be used. FIG. 4C shows the output of flip-flop 54. FIG. 4D shows the output of flip-flop 55. FIG. 4E shows the output of gate 56, and FIG. 4F shows the output of flip-flop 57.

Figure 5A:
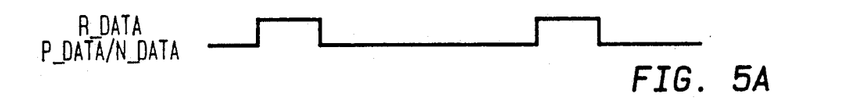
FIG. 5 is a series of waveforms FIGS. 5A to 5F necessary to explain operation of this invention.
Figure 5B:
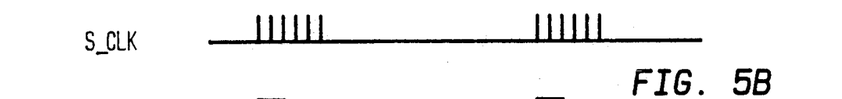
Figure 5C:
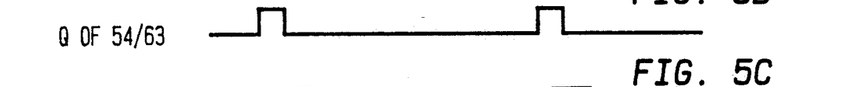
Figure 5D:
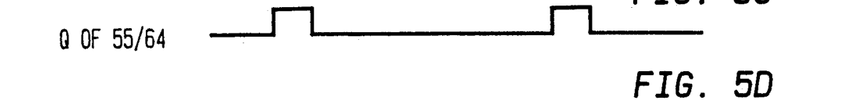
Figure 5E:
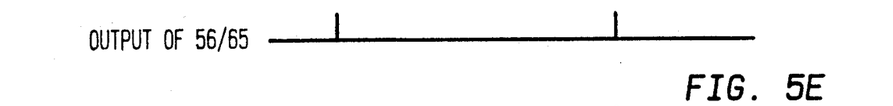
Figure 5F:
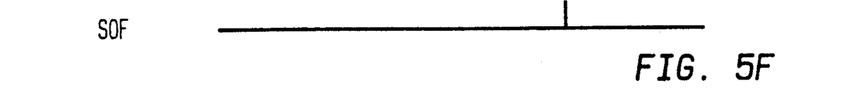

Referring to FIG. 5, there is shown the above-noted data at a different scale where FIG. 5A shows a typical P_DATA signal showing two pulses. FIG. 5B shows the nature of the S_CLK signal. FIG. 5C shows the output of flip-flops 54 and/or 63. FIG. 5D shows the output of flip-flops 55 and/or 64. FIG. 5E shows the output of gates 56 and/or 65. FIG. 5F shows the output of OR gate 59. Thus, as one can understand, the above-described circuit tests the duration of the incoming bit to separate real data from noise pulses. The circuit operates to generate a narrow output pulse at the center of the true period of the bit cells reducing jitter and wandering while generating the narrow output pulse (SOF) which can control a digital phase lock loop. The count used to determine the true period of the bit can be increased such that the higher the count, the closer the output pulse will be to the center of the true period. The circuit operates to completely reset and start from zero if it is activated by noise pulses. The circuit as described above, operates to detect modulation errors by generating more or less frequent SOF outputs.

I claim:

1. Apparatus for detecting a code violation in an incoming bipolar information signal having different polarity pulses each of a given duration, comprising:
   clock means for providing an output clock signal of a frequency greater than the frequency of said bipolar signal,
   counting means responsive to said incoming bipolar signal to count a predetermined number of one polarity levels of said bipolar signal with respect to said clock means to provide an output signal when said one polarity level does not change to another polarity level subsequent to obtaining a count of said predetermined number, and
   means responsive to said output signal from said counting means and to said bipolar information signal to detect a violation in said signal whereby said violation is indicative of said one polarity level followed by another said one polarity level in succession.

2. The apparatus according to claim 1, wherein said bipolar signal is an AMI signal.

3. The apparatus according to claim 1, wherein said one polarity level is the positive level (P_DATA) of said AMI signal.

4. The apparatus according to claim 1, wherein said one polarity level is the negative level (N_DATA) of said AMI signal.

5. The apparatus according to claim 1, wherein said clock means provides a given number of pulses during each duration of said one polarity level of said AMI signal.

6. The apparatus according to claim 5, wherein the center of said polarity level is indicative of a predetermined number of said given number of pulses.

7. The apparatus according to claim 1, further including:
   logic means responsive to the detection of said violation in said signal to provide a start of frame signal.

8. The apparatus according to claim 7, wherein said logic means includes latch means responsive to said pulse to provide an enable signal during said pulse and operative to prime one input of said latch means to enable the next pulse to cause said means to provide said start of frame signal.

9. The apparatus according to claim 7, wherein said counter is a two stage ring counter including first and second JK flip-flops, with the clear inputs adapted to receive said one polarity level signal and with the clock inputs adapted to receive said output clock signal.

10. The apparatus according to claim wherein said counting means includes a ring counter having a clock input responsive to said clock output signal and a clear input responsive to said one polarity level and including decoding gate means coupled to said counting means to provide an output when said counting means reaches a predetermined number to prevent further counting if said one polarity level does not change and means responsive to said counting means reaching said predetermined number to provide at an output a pulse indicative of said true polarity level of said AMI signal.

11. The apparatus according to claim wherein said clock means is generated only during the duration of said one polarity level signal.

12. Apparatus for providing a start of frame (SOF) signal for an incoming bipolar information signal, wherein one binary state is alternately encoded with positive and negative polarity pulses, each pulse of a given duration and the other binary state is encoded with a zero or reference level and wherein a violation of said encoding occurs when the polarity level of said pulses remains the same for two or more successive pulses wherein said violation may constitute a start of frame (SOF) signal, comprising:

means responsive to said bipolar signal to provide a first series of pulses indicative of said positive pulses and a second series of pulses indicative of said negative pulses, clock means operative to provide a high frequency clock output providing a predetermined number of pulses for each of said pulse durations, counting means responsive to said clock output and said first and second series of pulses to count to a predetermined number for each of said durations to provide a third series of pulses corresponding to true positive pulses and a fourth series of pulses corresponding to true negative pulses, by said counting means providing said third and fourth series of pulses relatively about the center of said pulse duration for each polarity, logic means responsive to said third and fourth series of pulses and said first and second series of pulses to provide an output signal (SOF) when at least two successive pulses indicative of said bipolar signal have the same polarity manifesting a code violation.

13. The apparatus according to claim 12, further including:

combining means responsive to said first and second series of pulses to provide a fifth series of pulses wherein said fifth series of pulses is indicative of both said negative and positive levels.

14. The apparatus according to claim 13, wherein said clock means includes means responsive to said fifth series of pulses and a high frequency input signal to define each of said pulse durations in said fifth series of pulses by a given number of high frequency pulses to provide at an output a sixth pulse series from said fifth series with each pulse duration containing said given number of high frequency pulses.

15. The apparatus according to claim 14, wherein said counting means includes a first ring counter responsive to said first series of pulses and said sixth pulse series to count to a given count to provide at an output a first additional pulse if said positive level pulse remains positive for said duration after said count, whereby said additional pulse is nearer the center of said incoming pulse duration, a second ring counter responsive to said second series of pulses and said sixth pulse series to count to said given count to provide at an output a second additional pulse if said negative level pulse remains negative for said duration after said count, whereby said second additional pulse is nearer the center of said incoming pulse duration.

16. The apparatus according to claim 15, wherein said first and second counters are two stage counters employing JK flip-flops.

17. The apparatus according to claim 16, wherein said logic means includes first and second latches with said first latch responsive to said first additional pulse to enable the same and with said second latch responsive to said second additional pulse to enable the same, with said first latch further responsive to said first series of pulses to cause said first latch to provide an output after enabled, for two successive pulses of said bipolar signal of a positive polarity and with said second latch further responsive to said second series of pulses to cause said second latch to provide an output, after enabled, for two successive pulses of said bipolar signal of a negative polarity, with said output of said first or second latch indicative of said start of frame (SOF) signal.

18. The apparatus according to claim 17, including:

first reset means responsive to said first additional pulse and coupled to said second latch for resetting said second latch when said first additional pulse is provided, second reset means responsive to said second additional pulse and coupled to said first latch for resetting said first latch when said second additional pulse is provided.

19. The apparatus according to claim 18, wherein said bipolar signal is an AMI signal.

20. Apparatus for providing a start of frame (SOF) signal for an incoming bipolar information signal wherein one binary state is alternately encoded with positive and negative polarity pulses each of a given duration and the other binary state is encoded with a zero or reference level and wherein a violation of said encoding occurs when the polarity level of said pulses remains the same for two or more successive pulses indicating a code violation which violation can be used as a start of frame (SOF) signal, comprising:

means responsive to said incoming bipolar signal to provide therefrom a first signal (P_DATA) indicative of positive polarity data of said bipolar signal, a second signal (N_DATA) indicative of negative polarity data of said bipolar signal, and a third signal (R_DATA) indicative of both negative and positive polarity data, with each of said signals having pulses of the same duration, clock means responsive to said third signal for providing at an output a clock signal having a predetermined number of pulses for each pulse duration of said first, second and third signals, first counting means responsive to said clock signal and said first signal to count to a predetermined number during each pulse duration of said first signal according to said clock signal until said predetermined number is reached and to provide a first output pulse if said polarity of said first signal did not change after said number is reached, second counting means responsive to said clock signal and said second signal to count to said predetermined number during each pulse duration of said second signal according to said clock signal until said predetermined number is reached and to provide a second output pulse if said polarity of said second signal did not change after said number is reached, output logic means responsive to said first, second and third signals including first and second latches with said first latch enabled by said first output pulse and with said second latch enabled by said second output pulse, with said first latch operative to provide an output signal when said input bipolar signal exhibits a positive polarity for two successive pulses, and with said second latch operative to provide an output signal when said input bipolar signal exhibits a negative polarity for two successive pulses, with said output signals combined so that either signal indicates a code violation which can be employed as a start of frame (SOF) signal.

* * * * *